United States Patent [19]
Aubele et al.

[11] Patent Number: 4,934,035
[45] Date of Patent: Jun. 19, 1990

[54] METHOD FOR PRODUCING FRICTION BEARING PARTS, IN SUCCESSIVE PROCESSING STEPS FROM RIBBON-LIKE COMPOSITE LAMINATE STRIP MATERIAL

[75] Inventors: Edwin Aubele, Taunusstein; Michael Kubert, Klein-Winternheim, both of Fed. Rep. of Germany

[73] Assignee: Glyco-Metall-Werke Daelen & Loos GmbH, Wiesbaden, Fed. Rep. of Germany

[21] Appl. No.: 312,134

[22] Filed: Feb. 17, 1989

[30] Foreign Application Priority Data

Feb. 18, 1988 [DE] Fed. Rep. of Germany ....... 3805036
Feb. 18, 1988 [DE] Fed. Rep. of Germany ....... 3804967

[51] Int. Cl.$^5$ ............................................. B21D 53/10
[52] U.S. Cl. ......................... 29/898.058; 29/898.057; 72/339; 72/404
[58] Field of Search ................... 29/33 S, 33 P, 33 Q, 29/149.5 R, 149.5 A, 149.5 B, 149.5 C, 149.5 DP, 149.5 S, 430; 72/339, 341, 404

[56] References Cited

U.S. PATENT DOCUMENTS

| | | | |
|---|---|---|---|
| 3,124,876 | 3/1964 | Putetti | 72/339 X |
| 3,206,830 | 9/1965 | Hart et al. | 29/149.5 C |
| 3,531,970 | 10/1970 | Pethick | 72/339 |
| 3,557,600 | 1/1971 | Saito et al. | 72/404 |
| 3,774,435 | 11/1973 | Wales et al. | 29/149.5 DP X |

FOREIGN PATENT DOCUMENTS

| | | | |
|---|---|---|---|
| 2147633 | 3/1972 | Fed. Rep. of Germany . | |
| 1677165 | 1/1973 | Fed. Rep. of Germany . | |
| 2235933 | 1/1973 | Fed. Rep. of Germany . | |
| 68139 | 5/1980 | Japan | 29/149.5 S |
| 336333 | 7/1929 | United Kingdom . | |
| 663476 | 6/1950 | United Kingdom . | |
| 2034827 | 6/1980 | United Kingdom | 29/149.5 S |

*Primary Examiner*—Timothy V. Eley
*Assistant Examiner*—Peter D. B. Vo
*Attorney, Agent, or Firm*—H. Gibner Lehmann; K. Gibner Lehmann

[57] ABSTRACT

Method and machine for producing friction bearing shells from ribbon-shaped composite laminate material, wherein the composite laminate material is fed and processed in successive stages at a multiplicity of successive stations until the shells are finished, except for the slide surface processing. The continuous processing includes chip-generating operations arranged to considerably improve the precision and quality of the friction bearing shells that are produced. The ribbon is blanked to produce individual plates which are disposed transverse to the transport direction, making it possible to work on each individual plate without reaction upon other plates. Scrap and chips are removed, preferably at spacing areas. The shells leaving the continuous production line are finished, except for any processing of the slide surfaces.

3 Claims, 8 Drawing Sheets

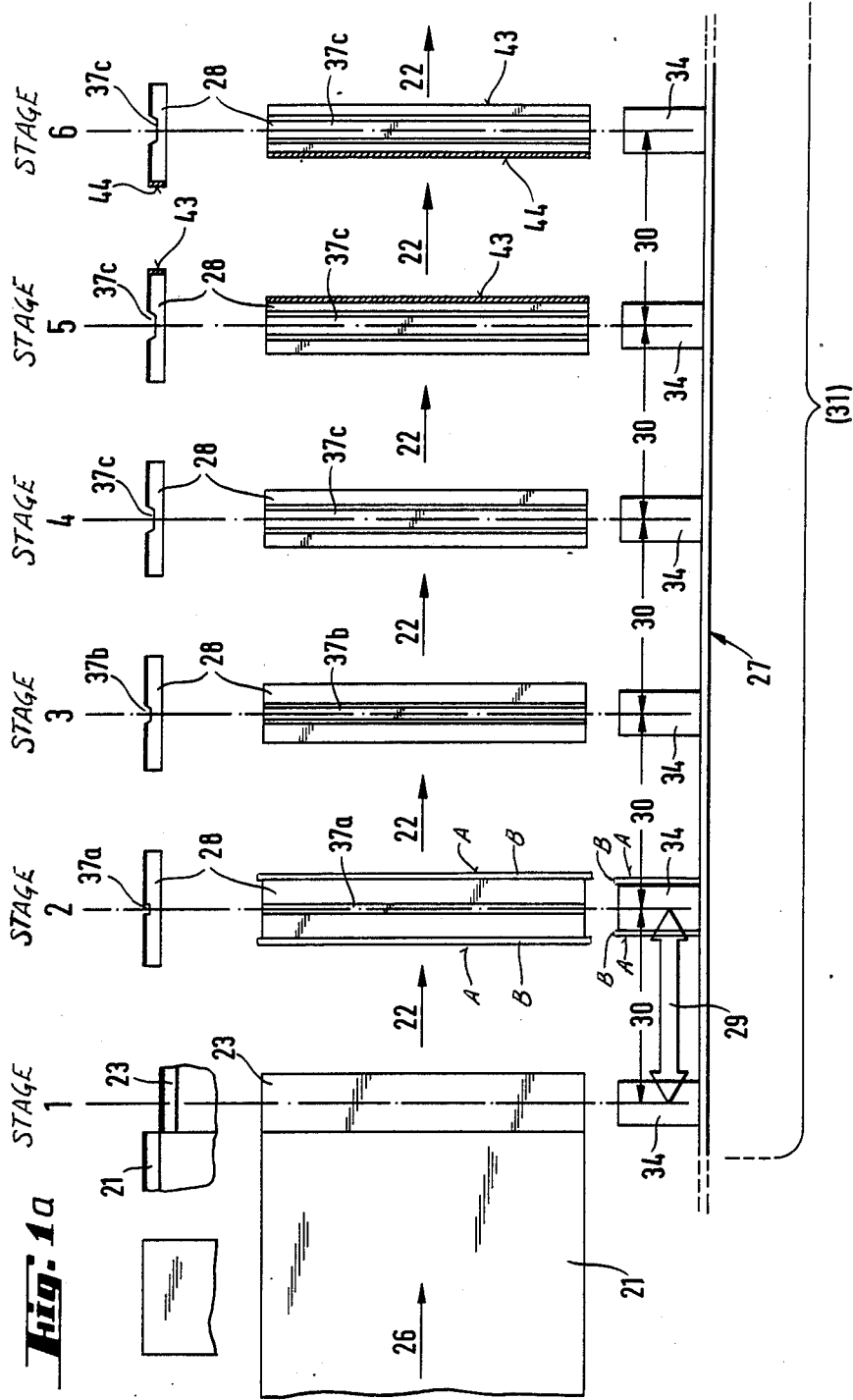

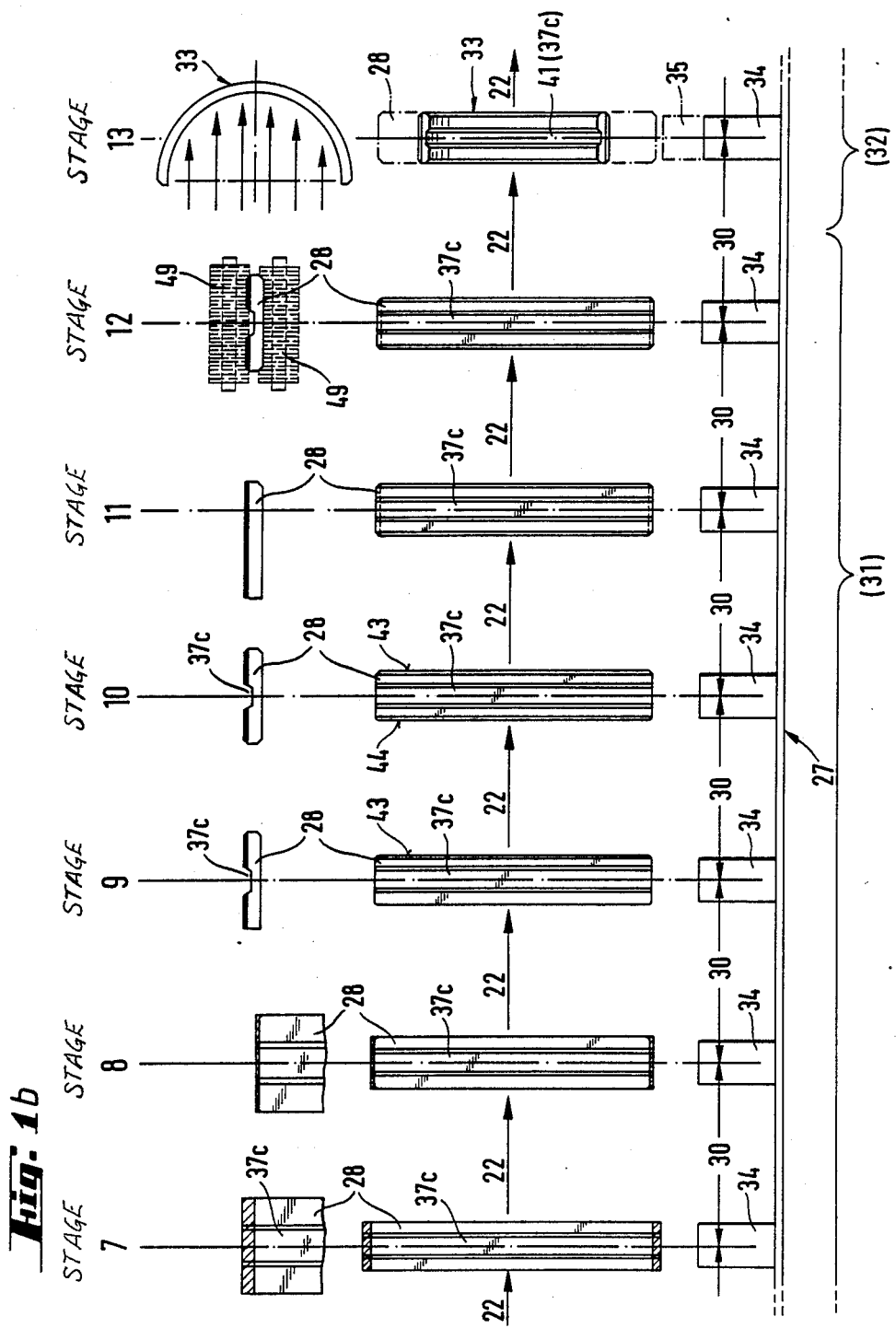

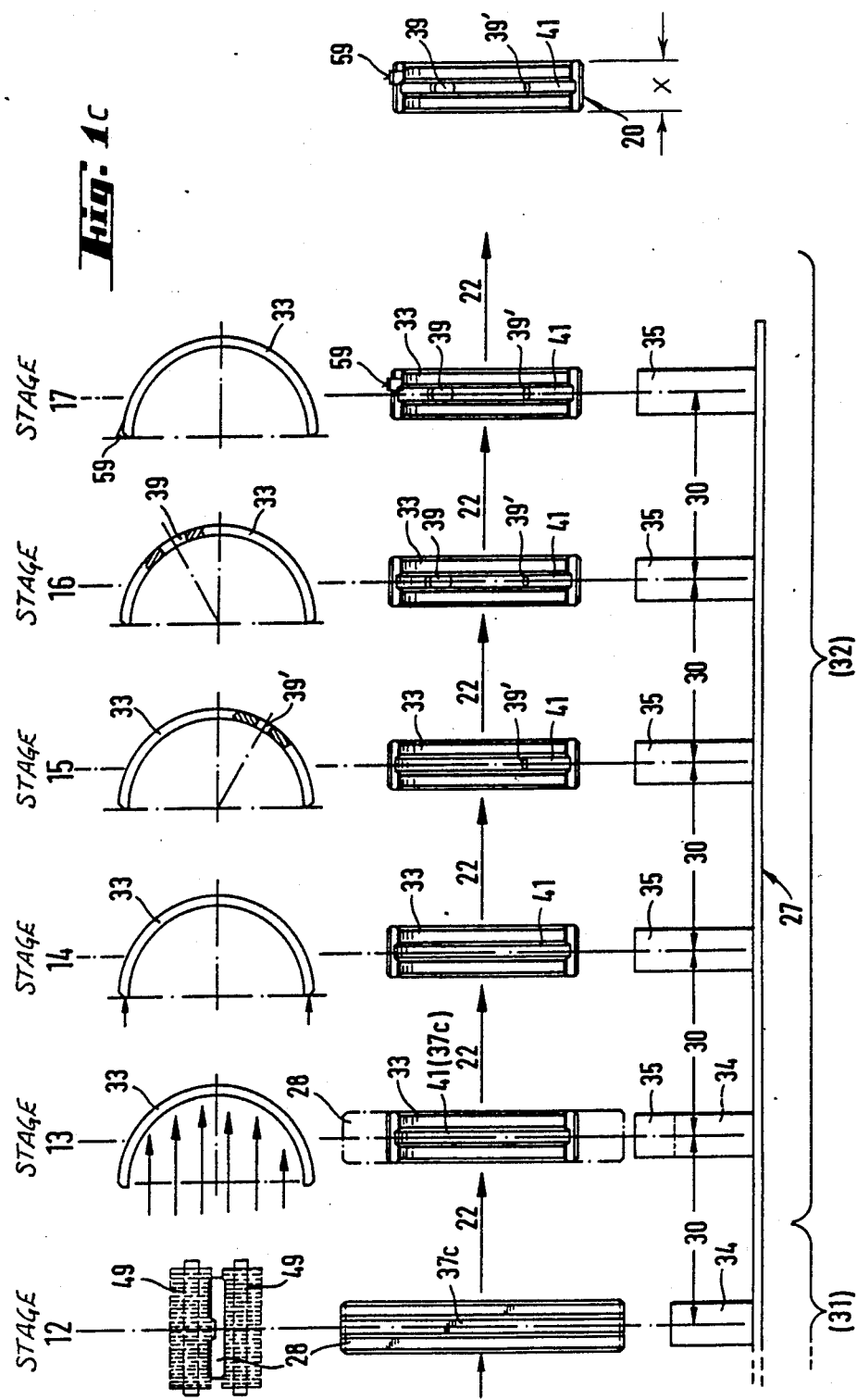

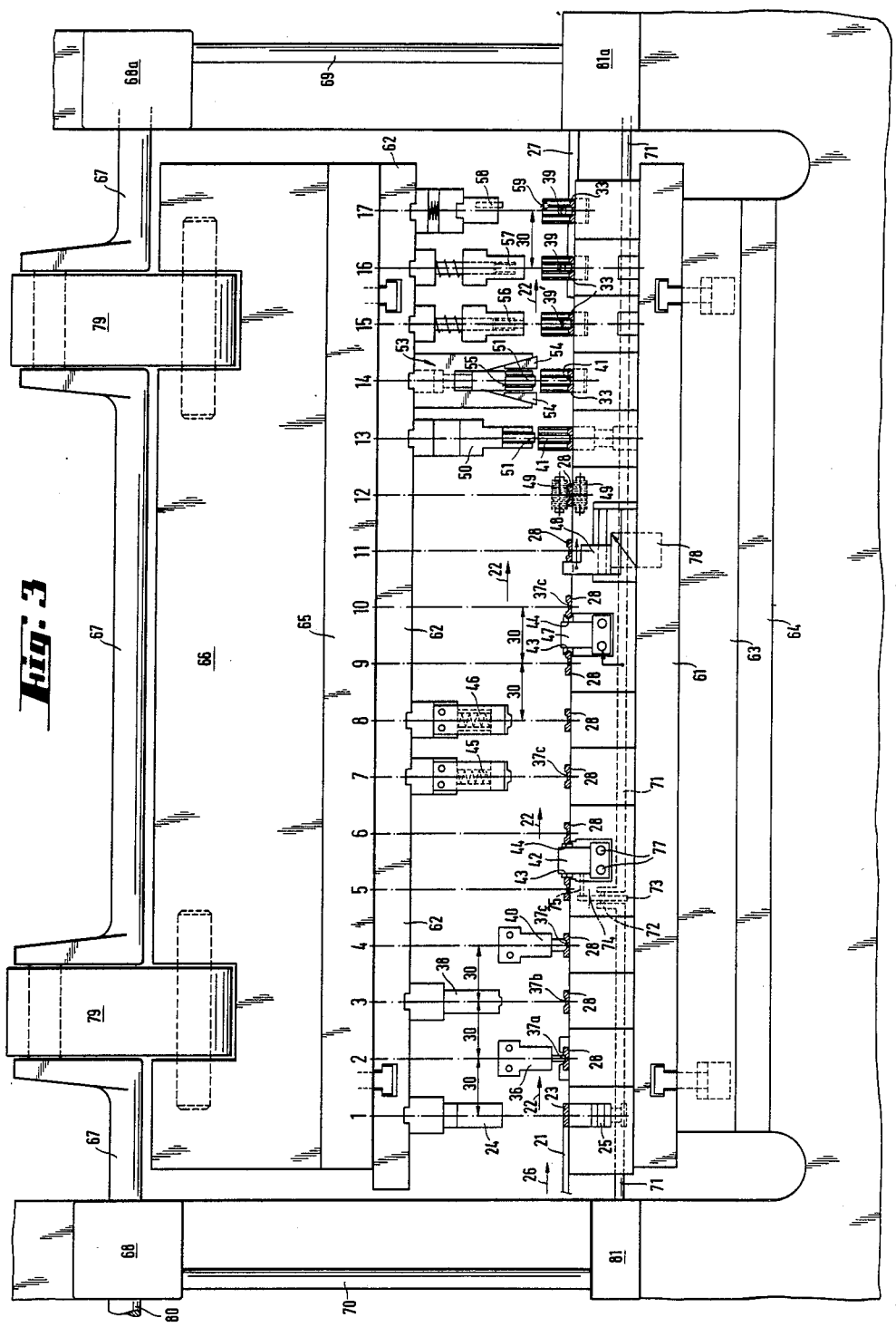

METHOD FOR PRODUCING FRICTION BEARING PARTS, IN SUCCESSIVE PROCESSING STEPS FROM RIBBON-LIKE COMPOSITE LAMINATE STRIP MATERIAL

STATEMENT AS TO RIGHTS TO INVENTIONS MADE UNDER FEDERALLY SPONSORED RESEARCH AND DEVELOPMENT.

Research and development of the present invention and application have not been Federally-sponsored, and no rights are given under any Federal program.

BACKGROUND OF THE INVENTION

1. Field Of The Invention

This invention relates to a method for producing semi-cylindrical friction bearing parts or shells from ribbon-like composite laminate material, wherein the composite laminate material is fed to a processing line and subjected, in a multiplicity of successive stations of a processing machine, to various processing steps, each designed as a work stroke, until the friction bearing parts are finished, except for machining of their sliding surfaces. The parts are transported or fed for this purpose, from one station to another of the processing line.

The invention also relates to a machine for the execution of this method, in which there are provided a common drive mechanism for the simultaneous automatic opening and closing of dies in the various stations, and a powered transporting mechanism for the composite laminate material and the workpieces formed thereof, which transporting mechanism traverses the series of successive stations.

2. Description Of The Related Art Including Information Disclosed Under 37 CFR §§1.97–1.99

Methods and machines of this kind, namely for the manufacture of friction bearing parts, in which a ribbon of laminate material is processed into friction bearing parts in a multistation processing line are already known. Reference is made to German Printed Application No. DE-AS 1 677 165 corresponds to U.S. Pat. No. 351637, German Publication No DE-OS 2147633 corresponds to U.S. Pat. No. 3724257, German Printed Application No. DE-AS 2 235 933 corresponds to U.S. Pat. No. 3774435, U S. Pat. No. 3,206,830, British Patent No. 336,333, and British Patent No. 663,476. In all of these known methods and machines the ribbon material is subjected to a considerable number of machining operations before being cut into individual plates or friction bearing elements. The drawback thereof is that the dimensional changes resulting from the various machining operations, in particular stamping and upsetting operations on the ribbon material, are additive in the direction of ribbon travel. More specifically, as the length of the processed ribbon material is increased, due to an increase in the number of machining stations, the alignment accuracy of the ribbon with respect to the tools or dies contained in each station becomes more and more imperfect. But it is of decisive importance for precision machining that there be exact alignment of the ribbon section that is being processed with respect to the tools or dies contained in each station. As a further drawback, it must be added that machining operations involving chip removal from a continuous ribbon of material cannot be effectively carried out in practice, due to problems in guiding of the unprocessed ribbon material, and the inaccessibility of cutting tools to the workpiece. Furthermore, it was hitherto impossible to remove the chips generated from the ribbon material with the required safety and completeness, as is necessary for a safe and exact completion of the work cycle, and for the attainment of adequate precision. While it is known from German Publication No. DE-0S 29 30 435, in a comparable method, to produce friction bearing parts by first scribing plates by impressing transversely extending grooves into the continuous ribbon material, and then machining the ribbon material in the area of the individual plates, and thereafter before the final forming of the semi-cylindrical friction bearing parts, deepening the impressed groove substantially on one side of the ribbon material by means of a cutting tool moved transverse to the ribbon material, this prior method is not practical because in order to be able to transform the frontmost, scribed plate into a semi-cylindrical friction bearing part and at the same time separate it from the ribbon material, the prior method is not properly engineered for, nor does it achieve, successful machining of the ribbon material or the individual plates cut from the ribbon material by chip removal. This is true regardless of the type of friction bearing part of the sliding layer which is preformed on the ribbon material.

SUMMARY OF THE INVENTION

In contrast to the above problems with prior methods, an object of the present invention is to make possible the correct execution of the various required processing steps in order to produce friction bearing parts with considerably improved precision, and especially to reduce substantially, the occurrence of material displacement when processing individual plates from which the parts are made, as the plates pass through various processing stages. Also, an object is to provide optimal processing methods which are applicable to each processing step. As a result, products of materially improved quality are attainable.

According to the invention, the problems of the prior art methods are solved in that the ribbon material is first cut, at the beginning of the processing, into individual plates lying transverse to the transport direction, one plate for each friction bearing part. These separate plates are transported one after the other, at identical mutual spacing and in common feeding steps, through the processing stations. Between the feeding steps each plate is subjected to a processing step, also including steps for machining the plates by chip removal. After each transport step and before each processing step an alignment of the respective plate or workpiece takes place for the next processing step. The plates, after having been machined by chip removal, are formed into bearing parts or cups (hereinafter also termed "shells") in the processing machine.

The early cutting of the ribbon material into individual plates precludes any adverse affects of one operation from being transferred to a successive operation, either before or after the said one operation. The individual alignment of the plates or workpieces in each station permits carrying out the various operations with great precision. By including "machining by chip removal" in the continuous cycle of operations, those areas which are difficult to shape by forming, or are capable of meeting only low quality standards, are made adaptable to higher quality standards, by the invention. Further, the inclusion of operations involving cutting tools in the continuous cycle of operations also enables carrying out the forming and stamping operations with greater precision and better quality. This is due to the fact that by employing machining by chip removal, the conditions for the execution of a forming or stamping operation are improved, and areas of the friction bearing part or plate which are processed in a stamping or forming operation can be posttreated optimally by cutting tools within the continuous cycle of operations. Also, the operations to be performed simultaneously on the various plates or workpieces can be of a different nature without adversely influencing each other. If for whatever reason, such as tool damage or material faults, errors or defects become apparent on a plate or workpiece, this does not adversely influence the processing of other plates or workpieces. Defective or faulty ribbon sections can be ejected early in the processing, as separate pieces.

The order in which operations are performed on the plates or workpieces can thus be arranged to provide optimal engineering quality, and attainment of precision, with no consideration being required regarding guidance and transport of the ribbon-like stock. As an example, impressing the circumferential grooves provided in the plates can be done prior to forming them into friction bearing parts.

According to the method of the invention, the plates which have been machined by chip removal can now be worked to the final circumferential length, the final axial width, and the final back contour of a bearing part by an upsetting operation while retaining the previously developed plate geometry, in particular the chamfers and groove or grooves. In this respect also, due to the inclusion of chip removing procedures in the continuous cycle of operations, the method according to the invention offers optimal preconditions for the forming or curving of the friction bearing parts or shells, after the required or desired operations involving cutting tools have essentially been carried out on the plates. During curving of the plates previously machined by chip removal, the precision achieved by the metal cutting operations is fully retained by the method of the present invention, and is even increased by the finish-forming or upsetting operation.

The stamping out of any required holes and the incising and/or impressing of arresting elements and the like can be done after the friction bearing parts have been formed in the processing machine, within the scope of the method of the invention.

In carrying out the method according to the invention, there is provided a machine equipped with a common drive mechanism to open or close the dies in the various stations, and having a powered transport mechanism for the composite laminate material and the workpieces formed thereof, which transport mechanism traverses the successive stations.

According to the invention, the transport mechanism is automatic and constructed to be synchronized with the fixtures of the various stations, for the purpose of gripping the individual plates after their having been cut from the ribbon material, and thereafter bringing them, in transport direction, into a fixed relative spacing and transporting them while in this spacing through the processing stations. The operating and actuating devices for the dies and cutting tools are connected to one common drive mechanism of a press for the synchronous automatic actuation of the work strokes, to open and close the dies, said press also furnishing the drive for the transport mechanism. Furthermore, there are incorporated in those stations equipped with cutting tools, devices for intensively cleaning the workpiece blank being treated therein. There consequently results a reliable processing function in this manner, which is engineered to achieve optimal precision in each processing station.

In particular it is assured by the invention that each workpiece, upon leaving a station equipped with cutting tools and during its transportation to the next processing station, is free of any chips or residues, so that processing can continue in the next station without concern about possible adverse contamination of the workpiece. This is especially true where forming or stamping stations are adjacent to stations adapted for machining with cutting tools. The devices for cleaning the plates or workpiece blanks may be of any suitable type within the scope of the invention, e. g. brush and/or suction devices for chips and other residues.

For those tools or dies which move either transverse to the transport direction, or else along the transport direction, by the present invention such motions can be synchronized from the drive mechanism which is provided for the opening and closing of the forming and stamping dies. For instance, the drive mechanism to open and close the forming and stamping dies can contain a crank drive, to whose crankshaft there is connected a driven shaft to generate cutting tool motions that are transverse to or also along the transport direction.

In the machine according to the invention, the circumferential grooves provided in the friction bearing part are readily produced in the plate. Also, the devices that produce such circumferential grooves in the plates are preferably disposed ahead of the station which produces the reference surfaces or faces of the friction bearing parts. The devices that produce circumferential grooves in the plates can contain tools of very diverse kinds, such as carriage tools or cutters which can be disposed in one station or in several stations.

It is preferred, in the machine according to the invention to equip the devices for producing the circumferential grooves with both cutting tools and stamping dies. For example, the devices for producing circumferential grooves can contain tools distributed over three successive stations, namely a fixture for rough-broaching (machining by chip removal) the groove, dies to widen and deepen the groove by stamping in the following station, and thereafter finishing tools, preferably for finish-broaching the grooves, in a third machining station. Another possibility for producing circumferential grooves in the plates is to position various types of tools to be distributed over three successive stations, namely devices for rough-broaching the groove (machining by chip removal) in the plate in a first processing stage, devices for the chip removing, widening and/or deepening of the groove by further broaching in a successive station, and devices for finish-broaching the groove in a successive third station.

For machining the axial faces of the friction bearing parts, the machine according to the invention offers the particularly advantageous execution, in two successive stations, by means of machining devices equipped with cutting tools which can pass between these neighboring stations in a direction which is transverse to the transport direction, at the same time being guided along the lateral edges of the plates that are located in these stations, for the simultaneous machining of these two plates. Chamfers at the faces of the friction bearing parts can be machined in a corresponding manner in two successive stations by means of machining devices with cutting tools which pass transverse to the transport direction between these neighboring stations, at the same time being guided along the lateral edges of the plates located in these stations for the simultaneous machining of these two plates.

The transport mechanism of the machine according to the invention can be equipped with gripping and holding elements engaging reference surface areas and/or face areas of the plates or friction bearing parts. A reliable gripping can thus be attained without deleterious effects on the more sensitive, prepared sliding layer.

The transport mechanism may be led, without interruption, through all stations. It can have two or more sections, such as one section for the transportation of the plates and one section for the transportation of the friction bearing parts formed of the plates.

Other features and advantages will hereinafter appear.

BRIEF DESCRIPTION OF THE DRAWINGS

One embodiment example of the invention is explained below in greater detail with reference to the drawing in which:

FIG. 1 shows schematically the processing stages of one preferred embodiment of the method according to the invention, starting with a ribbon material, up to the friction bearing part, which is finished, except for machining the sliding surface thereof.

FIG. 1 is divided into parts a, b and c.

FIG. 2 is also divided into parts to FIG. 1. FIG. 2 is also divided into parts a, b and c FIG. 3 is a schematic general layout of the machine according to FIG. 2, including its drive mechanisms.

DESCRIPTION OF THE PREFERRED EMBODIMENT

Figure 2A:
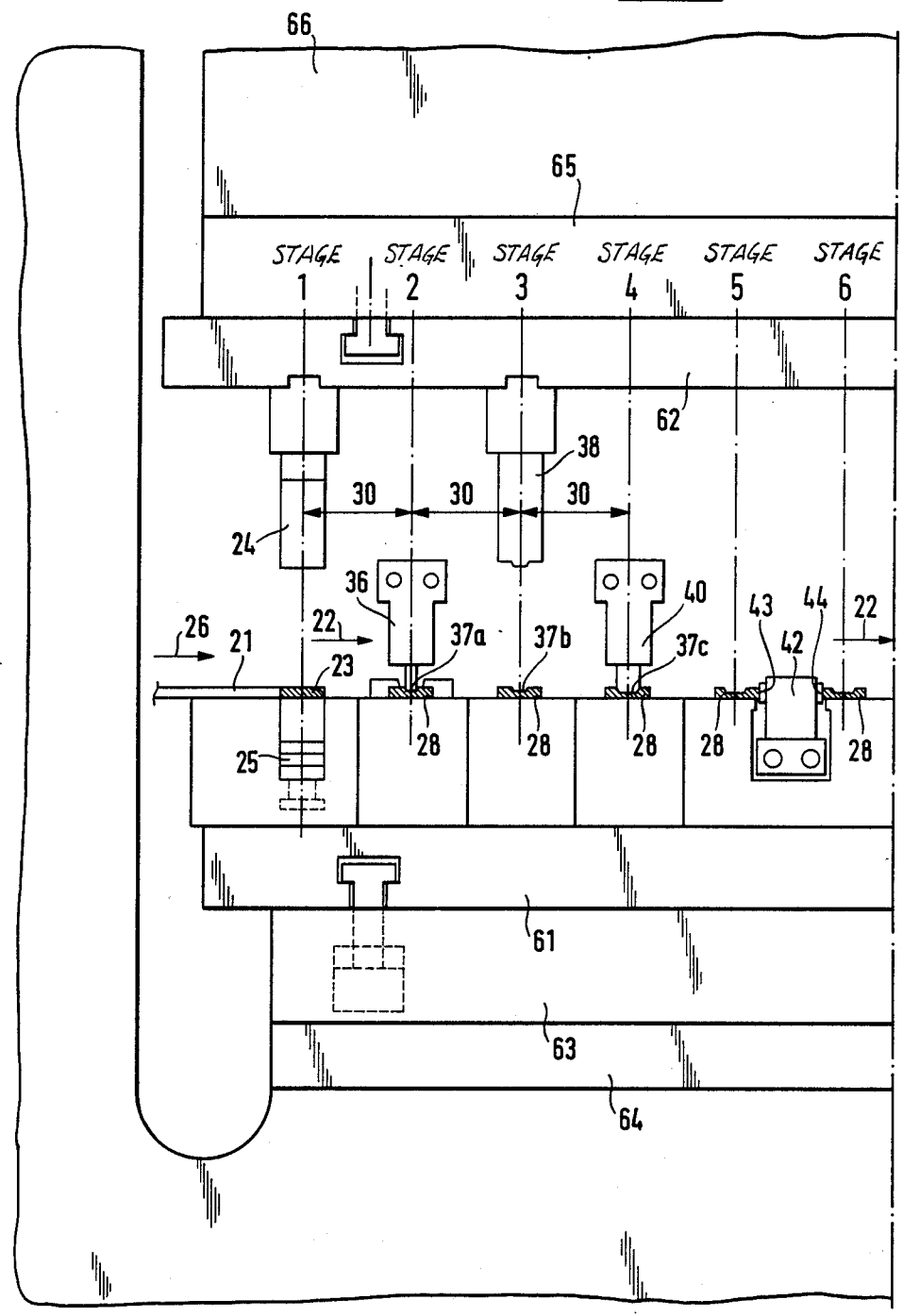
FIG. 2 is a machine for the execution of the method or the invention according to FIG. 1.

In the example of FIG. 1, a composite laminate ribbon material 21 is controllably fed to a processing line 27 containing machining stages and one inspection stage, being formed into finished semi-cylindrical friction bearing parts 20, except for machining the sliding surface thereof. The ribbon material 21 contains the layers essential for the friction bearing part 20, namely a carrier layer preferably consisting of steel, and at least one sliding layer of bearing material. In the example illustrated, the width of the ribbon material 21 fed to the processing line is somewhat greater than the circumferential length of the semi-cylindrical friction bearing parts 20 to be produced. The ribbon material 21 is fed, stepwise, in a direction 26 which, in this embodiment, is identical with a direction 22 hereinafter referred to as the transport direction. Each space interval 30 of the workstation is somewhat longer than the desired final axial width X of the friction bearing part 20 to be produced.

In "Stage 1" of the production process by the machine, a strip 23 is separated or cut from the front end of the ribbon material 21 in a stamping/cutting operation. The width of this cut strip 23 corresponds to the length of feed of the ribbon 21 corresponding to one feeding step. As FIG. 2a shows, an upper stamping and cutting die 24, a lower counterpressure die 25, and if required, pressure pads (not shown) are provided for this purpose in "Stage 1" of the machine.

Figure 2B:
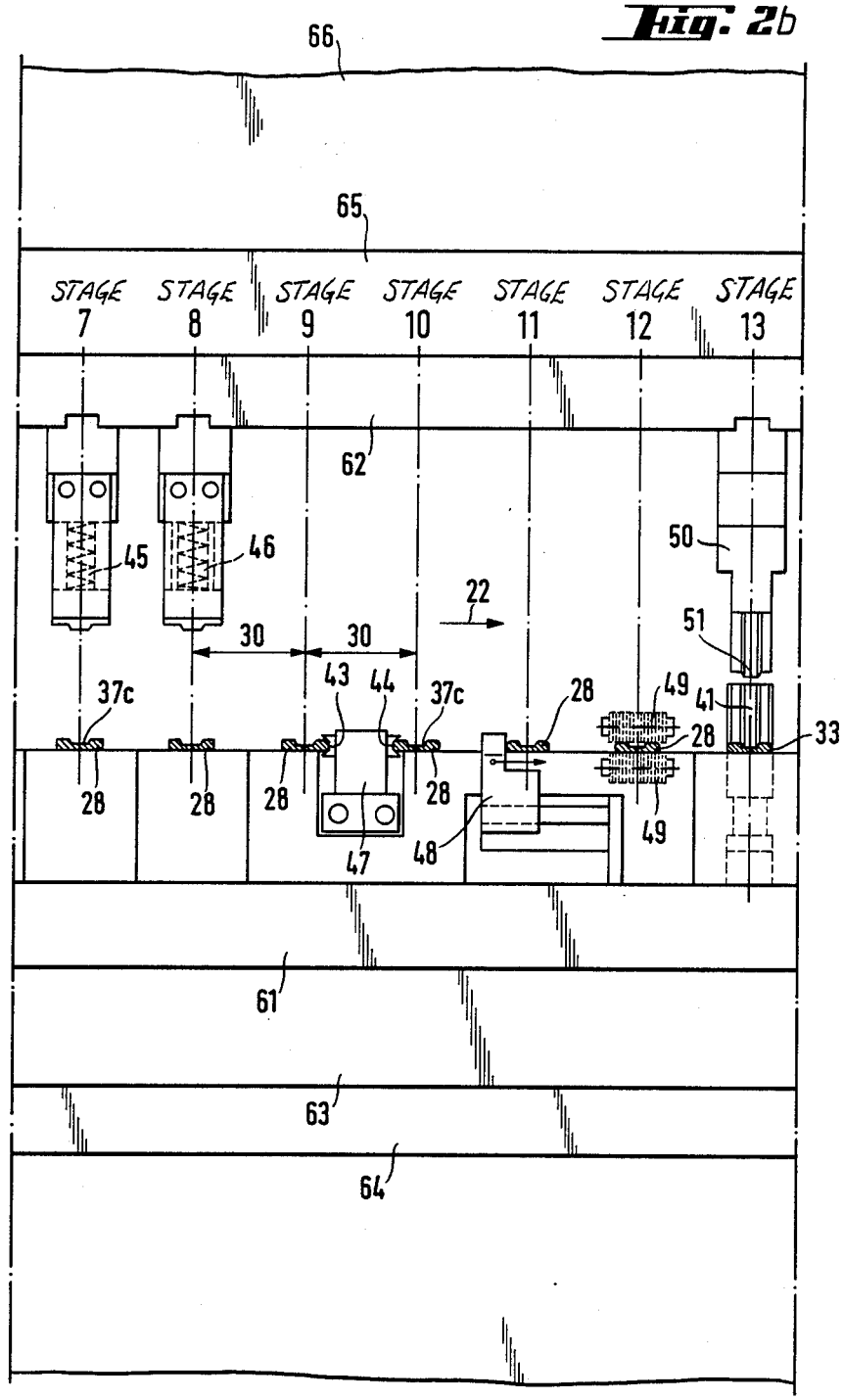

The strip 23, cut off the front end of the ribbon material 1, is tested for integrity in "Stage 1" of the process. If this test reveals a flawed strip, unsuited for the production of a friction bearing part, for instance due to incorrect cutting or material faults, this defective strip is ejected in the form of an individual plate. This occurs in FIG. 1a in the area designated by the double arrow 29 located between "Stage 1" and "Stage As FIGS. 1 and 2 show, the longitudinally movable transport mechanism 27 is also designed to transport the individual plates 8 and workpieces in the aligned, or transport direction 22 at identical, fixed, mutual spacing 30 through the processing stations, namely the "Stages 2 to 17". For this purpose, the transport mechanism 27 contains two parts or sections 31 and 32, of which the one part or section 31 extends from station "Stage 1", which cuts off the plates 28 or strips 23 from the ribbon material 21, up to station "Stage 13", which forms the plates into semi-cylindrical friction bearing moldings 33. In this part or section 31, the transport mechanism 27 is equipped with gripping and holding elements or nests 34 which overlap the end areas of the plates 28. These gripping and holding elements 34 are shown in FIG. 1 only at one end of each plate 28. Identical gripping and holding elements are also provided at the other end of each one of the plates 28. Holding the plates 28 in a pair of mutually opposite gripping and holding elements 34 such as this does not have to be of too great an accuracy, and the arrangement has been found to be completely adequate to shift the plates between "Stages 3 to 17" and position them in the stations. Exact, precise alignment is then accomplished by aligning devices in the form of oppositely disposed plates A presenting flanges B disposed in each "Stage 3 to 12".

In the example illustrated, the stations "Stage 2", "Stage 3" and "Stage 4" are equipped to form circumferential grooves that are desired in the friction bearing parts. Towards this end, tools 36 for rough-broaching a groove 37a are mounted in the station "Stage 2". Mounted in the station "Stage 3" are dies 38 to stamp out a deepened and widened groove 37b, i. e. to deepen and widen the initial groove 37a. Finally, in the third station, namely "Stage 4", tools 40 are provided to finish-broach a groove 37c, i. e. to widen and re-profile the groove 37b. The devices for producing longitudinal grooves in the plates 28 (circumferential grooves in the friction bearing parts to be produced) as provided in the stations "Stage 2" to "Stage 4", may be designed to suit any desired shape and number of circumferential grooves and may also be arranged differently. For example, in FIGS. 1 and 2, tools for chip removing machining of the circumferential groove or grooves could also be provided in the station "Stage 2", tools for continued broaching of the groove or grooves in the station "Stage 3", and dies for the finishing of the groove or grooves by stamping the station "Stage 4". It is also possible to equip all three stations of "Stages 2 to 4" with tools for roughing, semi-finishing and finishing the groove or grooves by chip removing operations, such as "broaching-broaching-broaching".

In FIG. 1 the group of stations "Stages 2 to 4" to produce circumferential grooves in the friction bearing parts (longitudinal grooves in the plates 28) is followed by a pair of stations "Stage 5" and "Stage 6". In this pair of stations, the plates 28 placed there by the transport mechanism 27 are fixed in exactly aligned position and machined by chip removal on the mutually opposite axial faces by means of a machining fixture 42 in between the two stations "Stage 5" and "Stage 6", in a broaching operation. This broaching operation takes place at the axial face 43 which, in the transport direction 22, is the front face of the plate 28 located in the station "Stage 5" and at the axial face 44 which, in transport direction 22, is the rear face of the plate located in the station "Stage 6" so that this broaching operation is completed on both axial faces 43 and 44 of plate 28 when it leaves the station "Stage 6".

As FIGS. 1a and 1b show, the station pair "Stages 5 and 6" is followed by two stations "Stage 7" and "Stage 8" for machining of the reference surfaces of the friction bearing parts to be produced. In the station "Stage 7", the plate 28 is cut to length at both ends by means of cutting and stamping tools 45. The remaining length of plate 28 is still somewhat greater than the desired circumferential length of the friction bearing parts 33 to be produced. The scrap generated by these cutting operations is removed safely and completely in the station "Stage 7" so that it cannot interfere with the further course of the processing cycle. Simultaneously with cutting the reference surfaces to length, the designation of the friction bearing parts to be produced is impressed on the back side of the friction bearing parts 28 in the station "Stage 7".

The station "Stage 8" provided for machining the reference surfaces contains devices 46 for shaving and smoothing the previously cut reference surfaces, employing a fine, chip-generating treatment.

Following the two stations "Stage 7" and "Stage 8" for the treatment of the reference surface is another pair of stations "Stage 9" and "Stage 10". In this station pair, the faces 43 and 44 of plate 28 that were formed in the station pair "Stages 5 and 6" are chamfered. Similar to the device between the station pair "Stages 5 and 6", a fixture 47 which can move transverse to the transport direction between the stations "Stage 9" and "Stage 10" is provided for this purpose. This fixture 47 is designed to chamfer the mutually opposing faces of the plates 28 which were formed earlier in the station pair "Stages 5 and 6". In a manner corresponding to the action in the station pair "Stages 5 and 6", the plate 28 exits "Stage 10" with chamfers on both axial faces 43 and 44.

This station pair "Stages 9 and 10" is followed by a station "Stage 11" which is provided to chamfer the reference surfaces formed in the stations "Stages 7 and 8". Towards this end, this station "Stage 11" contains devices 48 which are movable in transport direction 22 and cause the desired chamfering through fine, chip-generating machining. The plates 28, thus finish-machined, are then transferred by the transfer mechanism of section 31 into the station "Stage 12" which serves the cleaning of the plate 28 and in which are mounted devices 49 such as brushes or washing facilities to clean the plates. The cleaned plates 28 are transferred by the last part of section 31 of the transport mechanism 27 to the station "Stage 13". This station bends, curves and shapes the plate into the semi-cylindrical configuration. In order to retain in this bending operation, the profile and size of the previously produced longitudinal groove, now designated 41, as it is transformed into a circumferential groove, i. e. to retain its geometry, a bending punch 50 provided in the bending station "Stage 13" is designed with a projection 51 engaging the groove 41.

The friction bearing part 33, now essentially in a semicylindrical shape, is then transported through additional processing stages by the second part or section 32 of the transport mechanism 27. In this section section 32, the transport mechanism 27 has gripping and holding elements 35 which grip the friction bearing part 33 in the area of the two reference surfaces and which project further than the gripping and holding element 34 in the section 31 of the transport mechanism. In this second section 32, the transport mechanism 27 is equipped with mutually opposite gripping and holding elements 34, of which only one each gripping and holding element 35 being indicated in FIG. 1c.

Figure 2C:
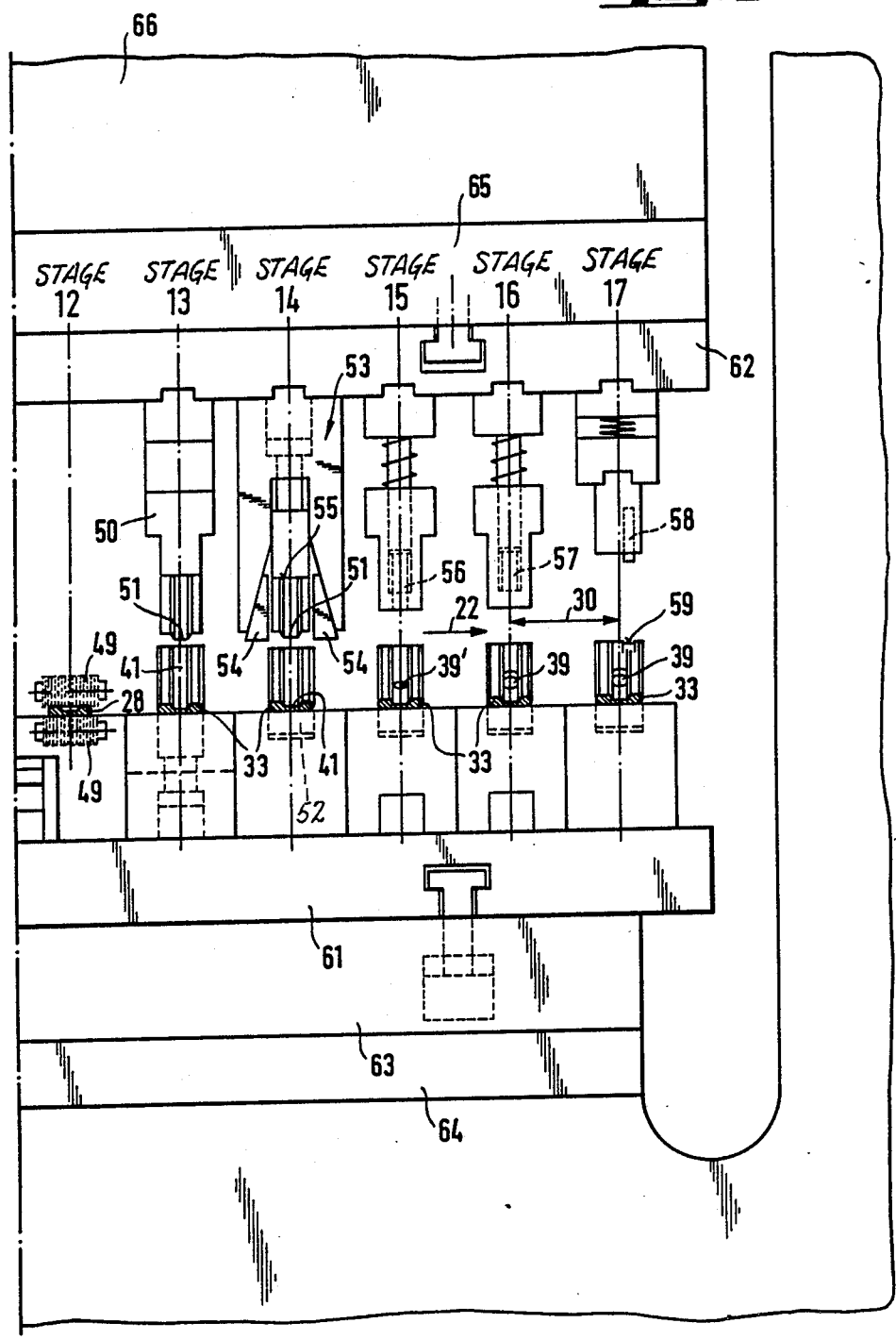

From the bending station "Stage 13", the semi-cylindrical part 33 is transferred to an upsetting station "Stage 14". It is in this upsetting station that the processed plates 33 are finish-formed to their final circumferential length, their final axial width and their final back contour for the friction bearing parts 20. As FIG. 2c shows, there is provided in the upsetting station "Stage 14" a suitable swaging tool 53 equipped with lateral forming parts 54 engaging the faces, upsetting dies 55 engaging the reference surfaces and a projection 51 engaging the groove 41. A female bending die is indicated at 52.

From the upsetting station "Stage 14" the semi-cylindrical parts 33 are transferred to punching and stamping stations "Stages 15 and 16". These punching and stamping stations "Stages 15 and 16" may be equipped selectively with hole punching dies 56 for round holes 39' or hole punching dies 57 for elongated holes 39. If holes of one type only are to be provided in the part 33, one or the other of these two stations "Stages 15 and 16" may be omitted.

Finally, the friction bearing parts 33 are transferred from the second punching and stamping station "Stage 16" to the station "Stage 17". There, arresting elements 59 are formed in the part 33 by means of appropriate cutting and bending tools 58.

The friction bearing parts now designated 20 leave the last station "Stage 17" in a finished state, except for the machining of the sliding surfaces, and for any additional coatings to be provided which are overlays or run-in layers, applied by electroplating, or as corrosion protection on all surfaces of the friction bearing part.

As FIG. 2 shows, the devices provided for all stations "Stages 1 through 17" are mounted to a tool base plate 61 and to a top plate 62. The tool base plate is mounted by means of a clamping plate 63, FIG. 3, to a press table 64 while the top plate 62 is mounted via an intermediate plate 65 to a ram 66 of the machine. In this manner, all fixtures of the stations "Stages 1 through 17" are actuated simultaneously by the downward motion of ram 66, and are opened by raising the ram 66. When the ram 66 is raised, i. e. in the open position, the plates 28 and the workpieces 33 are transported by means of the transport mechanism 27 by one step each, i. e. by the distance 30 from one station to the next. By passing through the stations "Stages 2 through 17", therefore, a useable strip 23 of ribbon material 21, formed in the station "Stage 1", has been transformed into a finished friction part 20, except for machining the sliding surface thereof. As shown in FIG. 1, part c, the friction bearing part 20 is outfitted with the desired circumferential groove 41 and possibly round holes 39' and/or elongated holes 39. The back side of the friction bearing part 20 and the axial faces and the reference surfaces have been given their final shape by the upsetting operation.

Figure 4:
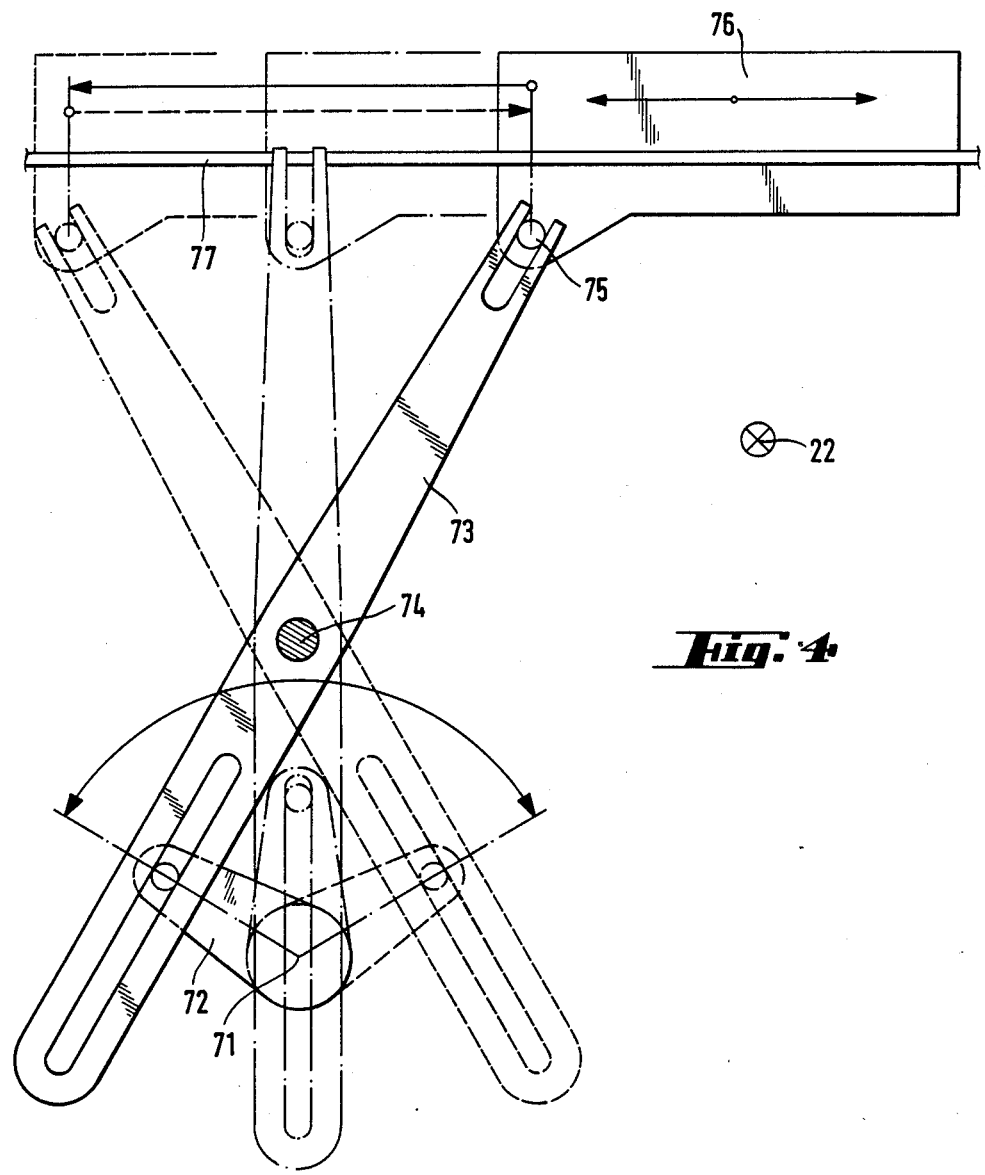
FIG. 4 is a schematic for the generating of movement and guiding of chip removal tools.

As may be seen from FIG. 3, in order to open and close the forming and stamping dies and actuate the cutoff tool of "Stage 1", the top plate 62 carrying these tools is connected via an intermediate plate 65 to the ram 66 which, in turn, is linked by two or more bars 79 to a crankshaft 67 mounted in the upper part of the machine. The crankshaft 67 is driven by a driveshaft 80 in a rotary or back and forth motion, there being provided and driven together with the crankshaft 67, first and second cam arrangements 68 and 68b, from which are derived a driven linkage 69 to drive through an intermediate gear 81a the transport mechanism 27, and through a driven linkage 70 to drive the mechanism through an intermediate gear 81 respectively. The driven linkage 70 leads via the intermediate gear 81a to a rockershaft 71 which extends along the tool base plate 61 above the clamping plate 63 and the press table 64 and the row of all processing stations "Stage 1" through "Stage 17". This rockershaft 71 has at every station, or at least at every station containing chip-generating cutting tools, a crank part 72, FIG. 4, and is driven in back and forth motion, in synchronism with the crankshaft 67, by the intermediate gear 81. Above the crank part 72 there is installed, in those stations which contain chip-generating cutting tools 76 movable transverse to the transport direction 27, a fork-shaped rocker arm 73 which pivots about a trunnion 74 above its lower forked part. At its end opposite its lower forked part, the rocker arm 73 is provided with a second forked part which engages a pivot pin 75 of the tool 76 which is movable back and forth in the ways 77 in the sense of the double arrow. This brings about a back and forth motion of the tool 76 transverse to the transport direction 22 and in synchronism with the motion of the crankshaft 67 and, hence, of the ram 66 supporting the forming and stamping dies.

If chip-generating cutting tools must be moved in the transport plane parallel to the transport direction, this can be accomplished by a deflection gear 78 to be attached to the rockershaft 71. This provides for the motion of tools for chip-generating machining to be moved parallel to the transport direction in synchronism with the motion of ram 66 and the motion of the forming and stamping dies supported by the latter.

In a modification of the embodiment example illustrated, a ribbon material could also be fed in, which is of slightly greater width than the desired axial width of the friction bearing parts 20 to be produced. This ribbon material would be introduced into the station "Stage 1" at right angles to the transport direction 22 and cut in the cutting station "Stage 1" with a cut parallel to the transport direction 22 to form strips 23 whose length is somewhat greater than the desired circumferential length of the friction bearing cup 20, i. e. corresponding to the dimensions of strip 23 per FIG. 1, part a.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

List of reference symbols
20 Semi-cylindrical bearing part
21 Ribbon material
22 Transport direction
23 Strip
24 Stamping and cutting die
25 Counterpressure die
26 Feeding direction
27 Transport mechanism
28 Plate
29 Double arrow
30 Space interval
31 Part or section of transport mechanism
32 Part or section of transport mechanism
33 Curved bearing part or molding
34 Gripping and holding element, or nest
35 Gripping and holding element, or nest
36 Tools
37 Circumferential groove in 20
37a Groove in processing stages
37b Groove in processing stages
37c Groove in processing stages
38 Die, stamping die
39 Elongate hole in 20
39' Round hole in 20
40 Die
41 Groove
42 Processing device
43 Axial front face
44 Axial rear face
45 Cutting and stamping die
46 Shaving and smoothing device
47 Processing Device
48 Processing Device
49 Cleaning or brush device
50 Male bending die
51 Projection
52 Female bending die
53 Swaging tool or upsetting die
54 Forming tool
55 Upsetting die
56 Hole punching die
57 Hole punching die
58 Cutting and bending tool
59 Arresting element
61 Die base plate
62 Top plate
63 Clamping plate
64 Press table
65 Intermediate plate
66 Ram
67 Crankshaft
68 First Cam arrangement
68a Second Cam arrangement
69 Driven linkage for 27
70 Driven linkage for 71
71 Rockershaft
72 Crank part
73 Rocker arm
74 Trunnion
75 Pivot pin
76 Tool
77 Ways
78 Deflection gear
79 Rod or bar
80 Driveshaft
81 Intermediate gear
81a Intermediate gear

What is claimed is:

1. A method for producing shaped friction bearing parts from ribbon-like composite laminate material, wherein the composite laminate material in the form of ribbon is fed to a processing line of a processing machine having a multiplicity of successive stations to carry out various processing steps each constituted as a work stroke, until finished bearing parts are produced except for machining of sliding surfaces, said laminate material being transported for this purpose to the processing line in feeding steps which occur timewise between work strokes, said method including the steps of cutting the laminate material at the beginning of the processing steps to form individual plates which extend transverse to the direction of transport of the laminate material, one plate for each friction bearing part; transporting the cutoff plates, equispaced from each other, past the said successive stations by common feeding steps; machining the cut-off plates with chip-generating cutting tools while maintaining alignment of the respective plates after each transport step and before each machining step, and forming the said plates, after the machining thereof by chip removal, into shaped bearing parts at a station in the processing line, and further including the step of impression grooves in the cut-off plates before they are formed into shaped bearing parts, and wherein the forming of the plates which have been machined by chip removal includes upsetting the plates to establish the final circumferential length, the final axial width and also the final back contour thereof without altering the previously established grooves.

2. A method according to claim 1, and further including the step of punching a hole in and forming an arresting element on the friction bearing plates in the processing line after the shaping thereof into bearing parts.

3. A method for producing shaped friction bearing parts from ribbon-like composite laminate material, wherein the composite laminate material in the form of ribbon is fed to a processing line of a processing machine having a multiplicity of successive stations to carry out various processing steps each constituted aS a work stroke, until finished bearing parts are produced except for machining of sliding surfaces, said laminate material being transported for this purpose to the processing line in feeding steps which occur timewise between work strokes, said method including the steps of cutting the laminate material at the beginning of the processing steps to form individual plates which extend transverse to the direction of transport of the laminate material, one plate for each friction bearing part; transporting the cutoff plates, equispaced from each other, past the said successive stations by common feeding steps; machining the cut-off plates with chip-generating cutting tools while maintaining alignment of the respective plates after each transport step and before each machining step, and forming the said plates, after the machining thereof by chip removal, into shaped bearing parts at a station in the processing line, and including the further step of forming chamfers in the cut-off plates before they are formed into shaped bearing parts, and wherein the forming of the plates which have been machined by chip removal includes upsetting the plates to establish the final circumferential length, the final axial width and also the final back contour thereof without altering the previously established chamfers.

* * * * *